(12) United States Patent
Woodcock et al.

(10) Patent No.: US 7,603,738 B1
(45) Date of Patent: Oct. 20, 2009

(54) BLOWER MOUNTING APPARATUS

(76) Inventors: James Woodcock, 8564 Rouse Rd., Warrior, AL (US) 35180; Jason Belcher, 337 Westview Rd., Gardendale, AL (US) 35071

( * ) Notice: Subject to any disclaimer, the term of this patent is extended or adjusted under 35 U.S.C. 154(b) by 478 days.

(21) Appl. No.: 11/327,161

(22) Filed: Jan. 6, 2006

Related U.S. Application Data

(60) Provisional application No. 60/642,411, filed on Jan. 7, 2005.

(51) Int. Cl.
*E01H 1/02* (2006.01)
(52) U.S. Cl. .......................... 15/79.2; 15/78; 15/340.1
(58) Field of Classification Search ................ 15/49.1, 15/78, 79.1, 79.2, 329, 327.5, 340.1, 405; 56/228, 193, 218, 255, DIG. 9; 414/685, 414/696
See application file for complete search history.

(56) References Cited

U.S. PATENT DOCUMENTS

| | | | | |
|---|---|---|---|---|
| 4,078,365 A | * | 3/1978 | Ingalls | ........................ 56/328.1 |
| 4,312,095 A | * | 1/1982 | Mullins | .................... 56/400.14 |
| 4,541,230 A | * | 9/1985 | Huerter | ........................ 56/193 |
| 4,597,203 A | * | 7/1986 | Middleton | .................... 37/241 |
| 5,119,619 A | * | 6/1992 | Zappia | ........................ 56/12.8 |
| 5,272,858 A | * | 12/1993 | Bonis | ........................ 56/12.8 |
| 6,530,115 B2 | * | 3/2003 | MacNeil | .................... 15/316.1 |
| 2003/0204932 A1 | * | 11/2003 | Hile | ........................... 15/340.4 |

* cited by examiner

*Primary Examiner*—Dung Van Nguyen
(74) *Attorney, Agent, or Firm*—Kenneth M. Bush; Gerald M. Walsh; Bush Intellectual Property Law

(57) ABSTRACT

An apparatus for mounting a street blower to the front end of a zero-turn riding mower. The mounting apparatus comprises a main support beam that extends across the front of the mower frame and rests on top of the frame. The main beam preferably includes a securing mechanism that engages the left and right angled extensions of the mower frame to keep the mounting apparatus from sliding forward, backward, or to the sides. On top of the main support beam is a central eyebolt for anchoring a chain that holds the blower such that the wheels of the blower are preferably all suspended above the ground. At least two lower support arms are attached to the main beam, each of which comprises a vertical support and a horizontal support. At one end of the horizontal support is a cradle designed to support the axle or rear frame of the blower.

4 Claims, 3 Drawing Sheets

BLOWER MOUNTING APPARATUS

RELATED PATENT APPLICATION

The present application claims priority to U.S. Provisional Patent Application No. 60/642,411, filed Jan. 7, 2005, incorporated herein by reference.

FIELD OF THE INVENTION

The present invention is related to grounds care equipment, and more particularly, to an apparatus for mounting a street blower to a riding mower.

BACKGROUND OF THE INVENTION

A street blower (a.k.a. roll blower, push blower, or parking lot blower) is a gasoline powered air blower used to blow leaves and other debris from roads, parking lots, sidewalks, lawns, etc. These blowers are significantly more powerful than backpack and handheld blowers and are typically used by commercial grounds care businesses. Because of the size and weight of street blowers, they are too heavy to be carried and are thus mounted on wheels to allow workers to operate them.

To improve the efficient use of street blowers, hitches have been developed for mounting the blowers to riding equipment, such as a zero-turn mower. A zero-turn mower is typically a commercial grade lawnmower supported on 4 wheels. The 2 rear drive wheels are hydraulically powered and independently controlled. The 2 front wheels are typically smaller castor wheels used only to support the front of the mower. By mounting the blower to the mower, the blower can easily be used in non-paved areas, such as lawns, and the speed of the mower allows the blowing process to be accomplished much quicker.

Presently used hitches use adapters that bolt on to the mower and/or the blower to couple the mower and blower together. A problem with these presently used hitches is that either the adapters must be removed from the equipment when the blower is not being used, a time-consuming and inconvenient process, or the adapters are left bolted to the equipment, resulting in added weight as well as obstructing the normal use of the equipment.

SUMMARY OF THE INVENTION

The present invention is a blower mounting apparatus for conveniently mounting a street blower to the front of a zero-turn riding mower. The mounting apparatus suspends the blower above the ground and does not interfere with the turning ability of the mower. The blower mounting apparatus comprises a main support beam that extends across the front of the mower frame and rests on top of the frame and behind the front castor swivel wheels. The main beam preferably includes a securing mechanism that engages the left and right angled extensions of the mower frame to keep the mounting apparatus from sliding forward, backward, or to the sides. On top of the main support beam is a central eyebolt for anchoring a chain that holds the blower such that the wheels of the blower are preferably all suspended above the ground. At least two (2) lower support arms are attached to the main beam, each of which preferably comprises a substantially vertical support and a longer substantially horizontal support. At one end of the horizontal support is a cradle designed to support the axle or rear frame of the blower.

DETAILED DESCRIPTION OF THE PREFERRED EMBODIMENT

The present invention is a blower mounting apparatus 10 for mounting a street blower 25 to the front of a zero-turn riding mower 30. The mounting apparatus 10 suspends the blower above the ground and does not interfere with the turning ability of the mower. No changes need to be made to the blower or mower to use the apparatus. The mounting apparatus will fit a number of different blower and mower combinations.

Figure 1:
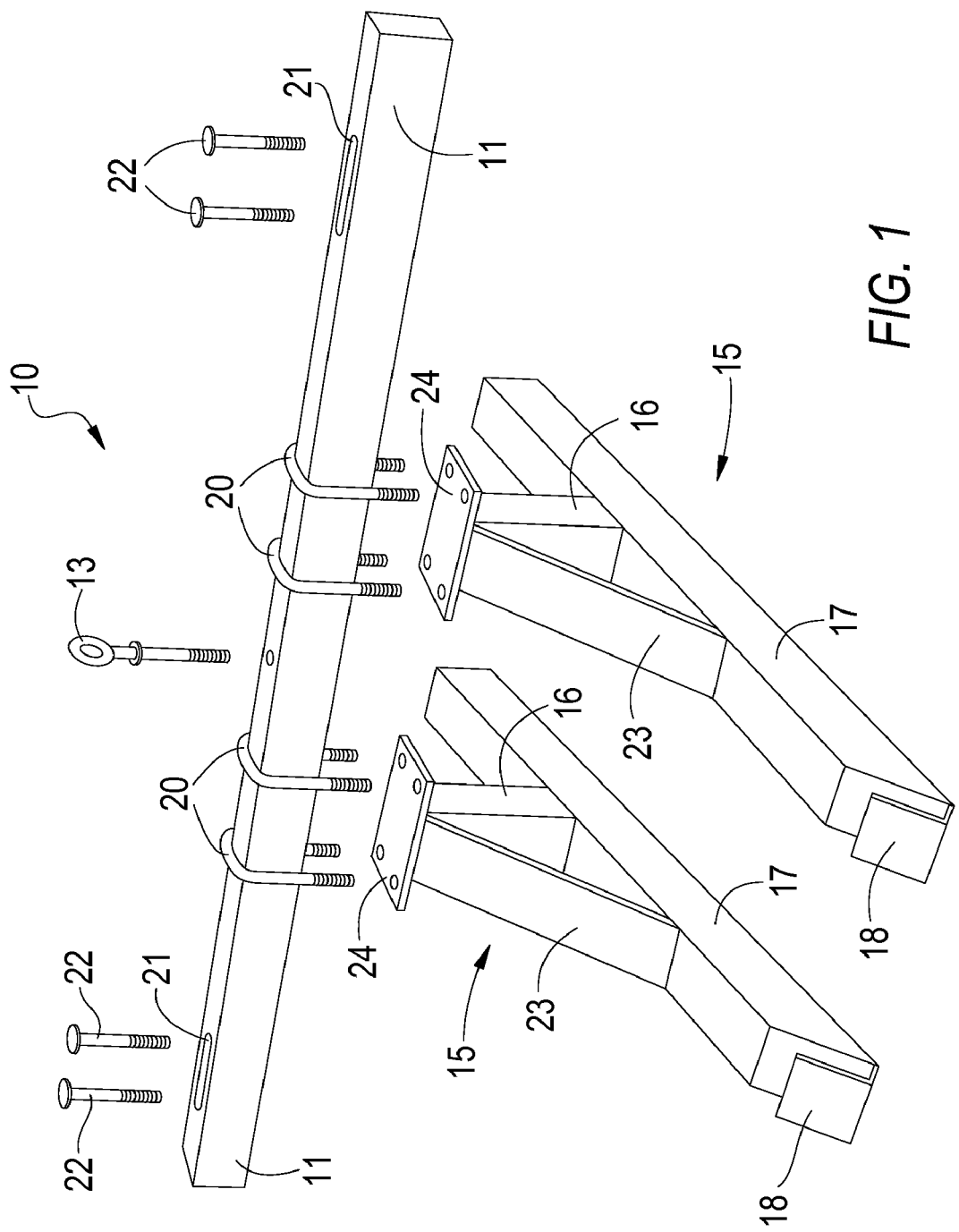
FIG. 1 is an exploded perspective view of the invention.
Figure 3:
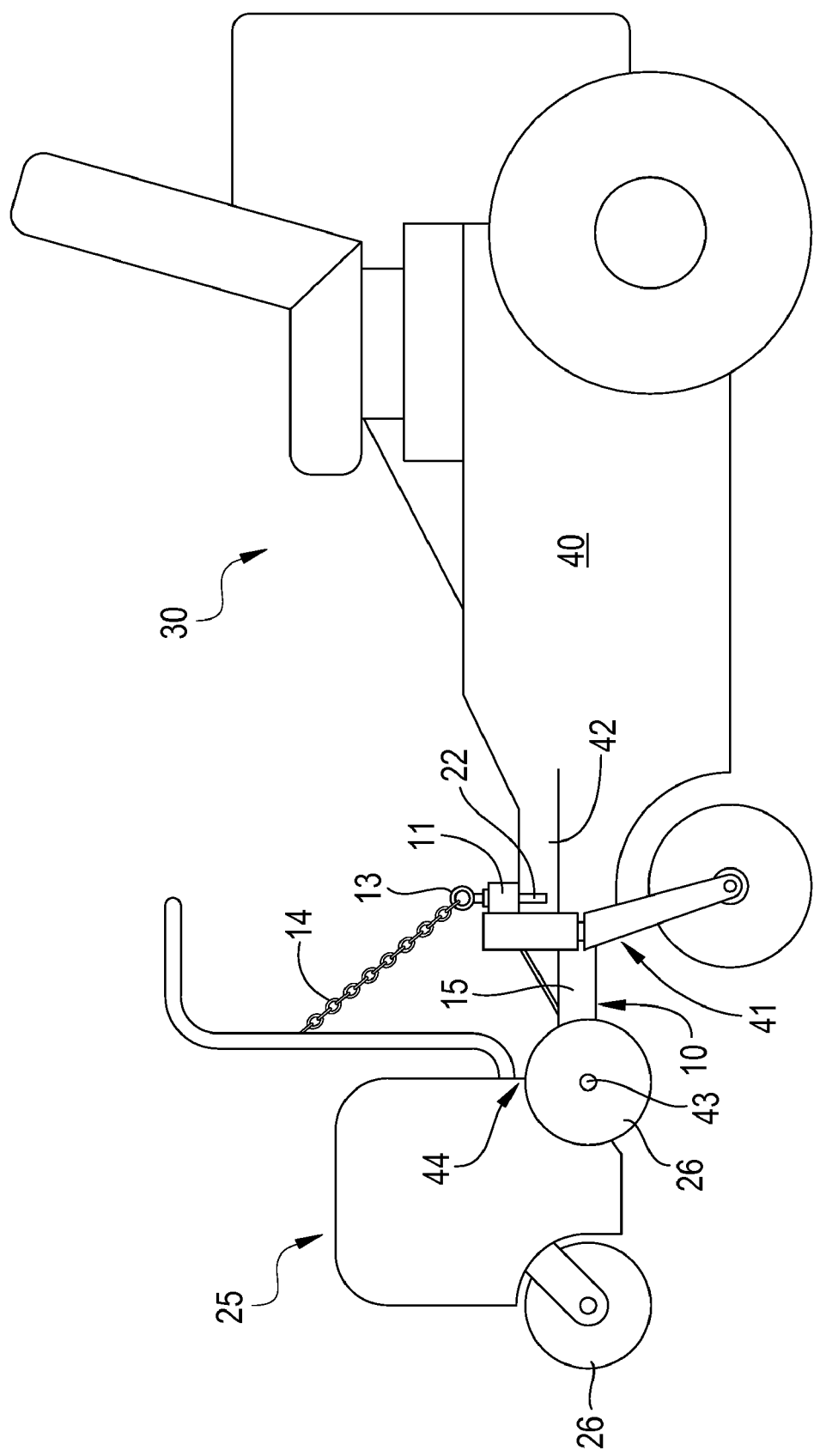
FIG. 3 is a side elevational view of the invention supporting a blower on a mower.

In the preferred embodiment shown in FIGS. 1 and 3, the blower mounting apparatus 10 comprises a main support beam 11 made of tubular metal that extends across the front of the mower frame 40 and rests on top of the frame 40 and behind the front castor swivel wheels 41, thereby preventing the mounting apparatus 10 from sliding forward. The main beam 11 supports the majority of the blower's 25 weight as well as centers the blower 25 on the mower 30. On top of the main support beam 11 is a central eyebolt 13 for anchoring a chain or wire 14 that holds the blower 25 such that the wheels 26 of the blower 25 are preferably all suspended above the ground. The chain 14 allows the blower 25 to tilt and float while remaining safely and securely attached to the mower 30.

The blower mounting apparatus 10 further comprises at least two (2) lower support arms 15, each of which preferably comprises one substantially vertical metal tube 16 and a longer substantially horizontal metal tube 17. Each support arm 15 preferably further comprises a diagonal brace 23 to provide additional structural support. The brace 23 is preferably a metal plate welded at its ends to the vertical and horizontal tubes 16, 17. The front end of horizontal tube 17 has a cradle 18 to support the axle 43 or rear frame 44 of the blower 25. The cradle 18 is preferably a J-shaped metal plate welded to the front end of horizontal tube 17. The lower support arms 15 are preferably attached to the main beam 11 by threaded square V-bolts 20 that are secured to metal plates 24 preferably welded to the tops of vertical tubes 16. Thus, the spacing between the lower support arms 15 can be adjusted to accommodate different sized blowers 25. Alternatively, the lower support arms 15 may be welded to the main beam 11.

Figure 2:
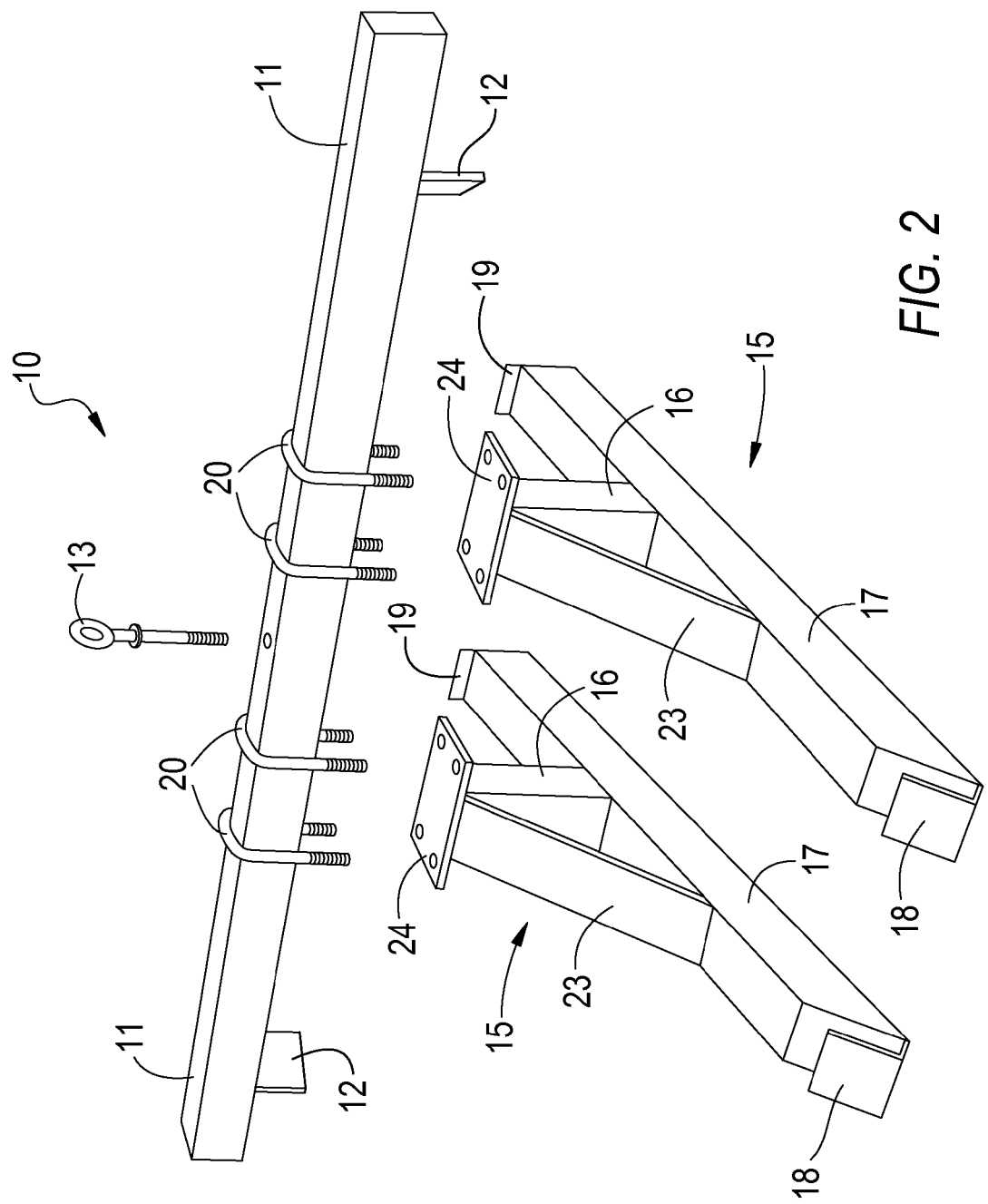
FIG. 2 is an exploded perspective view of an alternate embodiment of the invention.

The main beam 11 preferably has an elongated hole 21 toward each end, each hole 21 designed to receive two (2) threaded bolts 22 therethrough. These bolts 22 are designed to adjustably engage the sides of the left and right structural extensions 42 that connect the front castor swivel wheels 41 to the mower frame 40, thereby preventing the mounting apparatus 10 from sliding forward, backward, or to the sides. In an alternate embodiment shown in FIG. 2, the main beam 11 may include two (2) angled metal plates 12 to engage the inside of the left and right structural extensions 42 to prevent the mounting apparatus 10 from sliding backward or to the sides. The back end of the horizontal tube 17 may include a metal plate extension 19, shown in FIG. 2, for further securing the rear of the lower support arm 15 under the mower frame 40 and further preventing the apparatus 10 from sliding forward.

While the invention has been shown and described in some detail with reference to representative embodiments, there is no intention that the invention be limited to such detail. On the contrary, the invention is intended to include any alternative or equivalent embodiments that fall within the spirit and scope of the invention as described and claimed herein.

The invention claimed is:

1. An apparatus for mounting a street blower, having an axle and a rear frame, to a front end of a zero-turn riding mower, having a mower frame, front castor swivel wheels, and angled extensions that connect the front castor swivel wheels to the mower frame, said apparatus comprising:
   a) an elongated horizontal support beam adapted to rest on top of the mower frame behind the front castor swivel wheels;
   b) means for securing said support beam to the angled extensions;
   c) means centrally located on said support beam for anchoring a chain attached to the blower;
   d) at least two support arms mounted transversely to said support beam, wherein each support arm comprises a front end extending forwardly from said support beam and having a cradle for receiving the axle or rear frame of the blower; and
   e) wherein each end of said support beam has an angled plate mounted subjacent thereto for engaging one of the angled extensions that connect the front castor swivel wheels to the mower frame.

2. An apparatus for mounting a street blower, having an axle and a rear frame, to a front end of a zero-turn riding mower, having a mower frame, front castor swivel wheels, and angled extensions that connect the front castor swivel wheels to the mower frame, said apparatus comprising:
   a) an elongated horizontal support beam adapted to rest on top of the mower frame behind the front castor swivel wheels;
   b) means for securing said support beam to the angled extensions;
   c) means centrally located on said support beam for anchoring a chain attached to the blower;
   d) at least two support arms mounted transversely to said support beam, wherein each support arm comprises a front end extending forwardly from said support beam and having a cradle for receiving the axle or rear frame of the blower; and
   e) wherein each support arm comprises a back end extending rearwardly from said support beam, said back end having an extension for securing said back end to the mower frame.

3. An apparatus for mounting a street blower, having an axle and a rear frame, to a front end of a zero-turn riding mower, having a mower frame, front castor swivel wheels, and angled extensions that connect the front castor swivel wheels to the mower frame, said apparatus comprising:
   a) an elongated horizontal support beam adapted to rest on top of the mower frame behind the front castor swivel wheels, wherein each end of said support beam has an elongated hole therethrough;
   b) two pairs of bolts, wherein each pair of bolts is adapted to extend vertically through one of said elongated holes to adjustably engage the sides of one of the angled extensions that connect the front castor swivel wheels to the mower frame;
   c) an eyebolt centrally located on said support beam for anchoring a chain attached to the blower; and
   d) at least two support arms mounted transversely to said support beam, wherein each support arm comprises a front end extending forwardly from said support beam and having a cradle for receiving the axle or rear frame of the blower.

4. An apparatus for mounting a street blower, having an axle and a rear frame, to a front end of a zero-turn riding mower, having a mower frame, front castor swivel wheels, and angled extensions that connect the front castor swivel wheels to the mower frame, said apparatus comprising:
   a) an elongated horizontal support beam adapted to rest on top of the mower frame behind the front castor swivel wheels of the mower;
   b) an angled plate mounted subjacent each end of said support beam for engaging one of the angled extensions;
   c) an eyebolt centrally located on said support beam for anchoring a chain attached to the blower; and
   d) at least two support arms mounted transversely to said support beam, wherein each support arm comprises a front end extending forwardly from said support beam and having a cradle for receiving the axle or rear frame of the blower.

* * * * *